(12) United States Patent
Bossman et al.

(10) Patent No.: US 7,984,024 B2
(45) Date of Patent: *Jul. 19, 2011

(54) STATISTICS MANAGEMENT

(75) Inventors: Patrick Dooling Bossman, Alexandria, VA (US); You-Chin Fuh, San Jose, CA (US); Chan-Hua Liu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/140,994

(22) Filed: Jun. 17, 2008

(65) Prior Publication Data

US 2009/0030875 A1   Jan. 29, 2009

Related U.S. Application Data

(63) Continuation of application No. 10/752,915, filed on Jan. 7, 2004, now Pat. No. 7,412,439.

(51) Int. Cl.
*G06F 7/00* (2006.01)
*G06F 17/00* (2006.01)

(52) U.S. Cl. ......... 707/688; 707/687; 707/689; 707/690

(58) Field of Classification Search ............... 707/687, 707/688, 689, 690; 1/1
See application file for complete search history.

(56) References Cited

U.S. PATENT DOCUMENTS

| | | | |
|---|---|---|---|
| 5,689,698 A | 11/1997 | Jones et al. | |
| 5,734,884 A | 3/1998 | Eberhard et al. | |
| 5,754,841 A | 5/1998 | Cariño, Jr. | |
| 5,794,250 A | 8/1998 | Cariño, Jr. et al. | |
| 5,864,843 A | 1/1999 | Cariño, Jr. et al. | |
| 5,873,083 A | 2/1999 | Jones et al. | |
| 5,899,986 A | 5/1999 | Ziauddin | |
| 5,913,206 A | 6/1999 | Chaudhuri et al. | |
| 5,913,207 A | 6/1999 | Chaudhuri et al. | |
| 5,926,813 A | 7/1999 | Chaudhuri et al. | |
| 5,930,786 A | 7/1999 | Cariño, Jr. et al. | |
| 5,950,186 A | 9/1999 | Chaudhuri et al. | |
| 6,023,695 A | 2/2000 | Osborn et al. | |
| 6,026,391 A | 2/2000 | Osborn et al. | |
| 6,029,163 A | 2/2000 | Ziauddin | |
| 6,085,223 A | 7/2000 | Cariño, Jr. et al. | |
| 6,105,020 A | 8/2000 | Lindsay et al. | |
| 6,195,653 B1 | 2/2001 | Bleizeffer et al. | |
| 6,243,703 B1 | 6/2001 | Couch et al. | |
| 6,249,791 B1 | 6/2001 | Osborn et al. | |
| 6,351,742 B1 | 2/2002 | Agarwal et al. | |
| 6,353,818 B1 | 3/2002 | Carino, Jr. | |

(Continued)

OTHER PUBLICATIONS

Microsoft Corporation, "Statistical Information: Creating and Maintaining Databases (SQL Server)", [online]. © 2003 Microsoft Corporation, [Retrieved on Sep. 2, 2003]. Retrieved from the Internet at <URL: http://msdn.microsoft.com/library/en-us/createdb/cm_8_des_05_72r9.asp?frame+true>, 3 pp.

(Continued)

*Primary Examiner* — Paul Kim
(74) *Attorney, Agent, or Firm* — Janaki K. Davda; Konrad Raynes & Victor LLP

(57) ABSTRACT

Disclosed is a technique for maintaining statistics. A query is received. Column group generation is performed to form one or more column groups. Column group refinement is performed based on statistics data generated for a previously received query. A statistics check is automatically performed. A statistics collection command is generated to obtain statistics.

14 Claims, 6 Drawing Sheets

U.S. PATENT DOCUMENTS

| | | |
|---|---|---|
| 6,363,371 B1 | 3/2002 | Chaudhuri et al. |
| 6,366,901 B1 | 4/2002 | Ellis |
| 6,370,522 B1 | 4/2002 | Agarwal et al. |
| 6,370,523 B1 | 4/2002 | Anderson |
| 6,397,207 B1 | 5/2002 | Bleizeffer et al. |
| 6,401,083 B1 | 6/2002 | Agarwal et al. |
| 6,401,087 B2 | 6/2002 | Yanagimoto |
| 6,434,745 B1 | 8/2002 | Conley, Jr. et al. |
| 6,493,700 B2 | 12/2002 | Couch et al. |
| 6,529,901 B1 | 3/2003 | Chaudhuri et al. |
| 6,539,371 B1 | 3/2003 | Bleizeffer et al. |
| 6,744,449 B2 | 6/2004 | MacLeod et al. |
| 6,763,352 B2 | 7/2004 | Cochrane et al. |
| 6,847,962 B1 | 1/2005 | Cochrane et al. |
| 6,985,904 B1 | 1/2006 | Kaluskar et al. |
| 6,990,484 B1 | 1/2006 | Ghazal et al. |
| 7,080,062 B1 | 7/2006 | Leung et al. |
| 7,139,749 B2 | 11/2006 | Bossman et al. |
| 7,302,422 B2 | 11/2007 | Bossman et al. |
| 7,412,439 B2 | 8/2008 | Bossman et al. |
| 7,814,072 B2 | 10/2010 | Bossman et al. |
| 2002/0049700 A1 | 4/2002 | Couch et al. |
| 2002/0087518 A1 | 7/2002 | Ellis et al. |
| 2003/0009446 A1 | 1/2003 | Agarwal et al. |
| 2003/0065648 A1 | 4/2003 | Driesch, Jr. et al. |
| 2003/0088579 A1 | 5/2003 | Brown et al. |
| 2003/0093408 A1 | 5/2003 | Brown et al. |
| 2003/0115183 A1 | 6/2003 | Abdo et al. |
| 2003/0115508 A1 | 6/2003 | Ali et al. |
| 2003/0154216 A1 | 8/2003 | Arnold et al. |
| 2003/0158842 A1 | 8/2003 | Levy et al. |
| 2003/0177137 A1 | 9/2003 | MacLeod et al. |
| 2003/0182276 A1 | 9/2003 | Bossman et al. |
| 2004/0010488 A1 | 1/2004 | Chaudhuri et al. |
| 2004/0034643 A1 | 2/2004 | Bonner et al. |
| 2004/0059743 A1 | 3/2004 | Burger |
| 2004/0181521 A1 | 9/2004 | Simmen |
| 2004/0243555 A1 | 12/2004 | Bolsius et al. |
| 2005/0138015 A1 | 6/2005 | Dageville et al. |
| 2008/0033912 A1 | 2/2008 | Bossman et al. |

OTHER PUBLICATIONS

Amendment after Notice of Allowance Under 37 CFR 1.312/Comments on Statements of Reasons for Allowance, Apr. 14, 2008, for U.S. Appl. No. 10/752,915, Total 8 pp.

Astrahan et al., "Access Path Selection in a Relational Database Management System", [online], IBM Technical Disclosure Bulletin, Sep. 1979, [Retrieved on Nov. 26, 2003]. Retrieved from the Internet at <URL: https://www.delphion.com/tdbs/tdb?order=79A+05833>, Total 4 pp.

Bossman, P., "Tuning SQL with Statistics", The IDUG Solutions Journal, Aug. 1999, vol. 6, No. 2, Total 5 pp.

Bruni, P., M. Antonelli, T. Crocker, D. Goethals, R. Naidoo, and B. Steegmans, "DB2 for z/OS and OS/390 Version 7 Using the Utilities Suite", IBM Aug. 2001, Total 60 pp.

Cheng et al., "Multiple Indexed Access Path in a Relational Database System", [online], IBM Technical Disclosure Bulletin, Mar. 1990, [Retrieved on Nov. 26, 2003]. Retrieved from the Internet at <URL: https://wwww.delphion.com/tdbs/tdb?order=90a+61127>, Total 4 pp.

Final Office Action 1, May 4, 2007, for U.S. Appl. No. 10/752,915, Total 11 pp.

IBM Corp., "DB2 Universal Database for OS/390 and z/OS, Utility Guide and Reference Version 7", Jun. 2003, Total 27 pp.

IBM Corp., "Gathering Monitor and Update Statistics", IBM Corporation 1982, 2004, last updated: Mar. 2004, Total 2 pp.

IBM Corp., "Querying the Catalog for Statistics", IBM Corporation 1982, 2004, last updated: Mar. 2004, Total 1 p.

IBM Corp., "TDB: DB2 Cost Formula", [online], IBM Technical Disclosure Bulletin, May 1992, [Retrieved on Nov. 26, 2003]. Retrieved from the Internet at <URL: https://www.delphion.com/tdbs/tdb?order=92A+61329>, Total 4 pp.

Microsoft Corp., "Statistical Information (Creating and Maintaining Databases (SQL Server))", © 2003 Microsoft Corporation, Total 3 pp.

Notice of Allowance 1, Jul. 17, 2007, for U.S. Appl. No. 10/824,856, Total 17 pp.

Notice of Allowance 1, Mar. 18, 2008, for U.S. Appl. No. 10/752,915, Total 7 pp.

Office Action 1, Jul. 14, 2006, for U.S. Appl. No. 10/752,915, Total 11 pp.

Office Action 1, Oct. 16, 2006, for U.S. Appl. No. 10/824,856, Total 18 pp.

Final Office Action 1, Mar. 5, 2007, for U.S. Appl. No. 10/824,856, Total 12 pp.

Office Action 1, Feb. 4, 2010, for U.S. Appl. No. 11/873,252, Total 29 pp.

Office Action 3, Sep. 12, 2007, for U.S. Appl. No. 10/752,915, Total 12 pp.

Response to Rule 312 Communication, May 14, 2008, for U.S. Appl. No. 10/752,915, Total 2 pp.

Response to Rule 312 Communication, Oct. 22, 2007, for U.S. Appl. No. 10/824,856, Total 15 pp.

Sanjeev, "Working with History: DB2 Catalog History Tables", [online], [Retrieved on Jul. 19, 2004]. Retrieved from the Internet at <URL: http://www.idug.org/idug/member/journal/Mar02/articl09.cfm>, Total 10 pp. Sanjeev, "Working with History: DB2 Catalog History Tables", [online], [Retrieved on Jul. 19, 2004]. Retrieved from the Internet at <URL: http://www.idug.org/idug/member/journal/Mar02/artic109.cfm>, Total 10 pp.

Supplemental Notice of Allowability, May 8, 2008, for U.S. Appl. No. 10/752,915, Total 3 pp.

Amendment 1, Jan. 16, 2007, for U.S. Appl. No. 10/824,856, Total 23 pp.

Amendment 1, Aug. 17, 2009, for U.S. Appl. No. 11/028,186, Total 67 pp.

Amendment 2, May 7, 2007, for U.S. Appl. No. 10/824,856, Total 24 pp.

RCE and Amendment 3, Jun. 5, 2007, for U.S. Appl. No. 10/824,856, Total 25 pp.

312 Amendment, Oct. 15, 2007, for U.S. Appl. No. 10/824,856, Total 21 pp.

Amendment 1, Oct. 16, 2006, for U.S. Appl. No. 10/752,915, Total 15 pp.

Amendment 2, Aug. 6, 2007, for U.S. Appl. No. 10/752,915, Total 17 pp.

Amendment 3, Dec. 10, 2007, for U.S. Appl. No. 10/752,915, Total 13 pp.

NOA & Examiner's Amendment, Mar. 18, 2008, for U.S. Appl. No. 10/752,915, Total 7 pp.

Notice of Allowance 1, Jun. 4, 2010, for U.S. Appl. No. 11/028,186, Total 56 pp.

Final Office Action 1, Nov. 16, 2009, for U.S. Appl. No. 11/028,186, Total 71 pp.

Office Action 1, Apr. 17, 2009, for U.S. Appl. No. 11/028,186, Total 70 pp.

RCE and Amendment, Mar. 16, 2010, for U.S. Appl. No. 11/028,186, Total 34 pp.

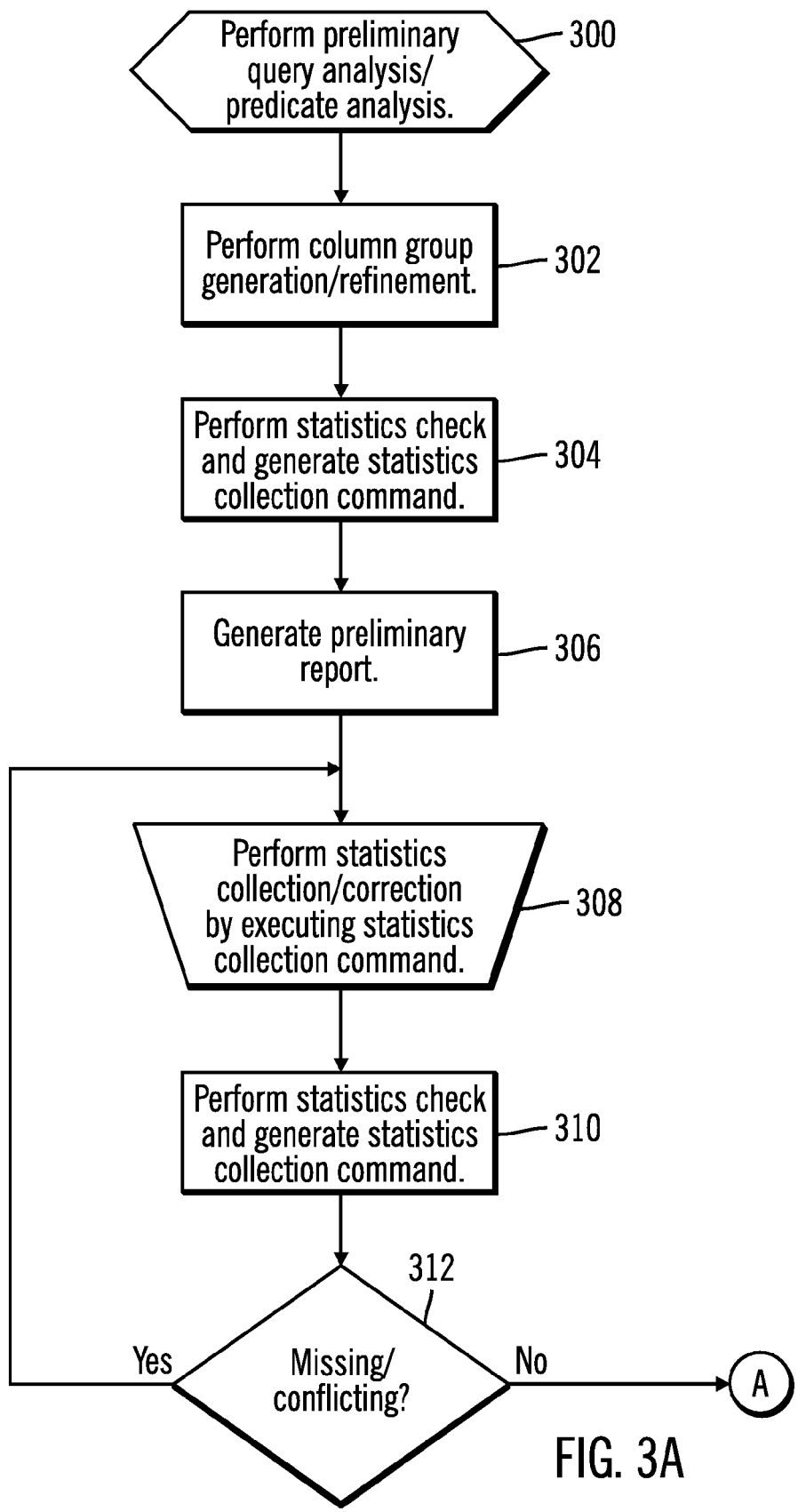

STATISTICS MANAGEMENT

CROSS-REFERENCE TO RELATED APPLICATIONS

This application is a continuation of and claims the benefit of "METHOD FOR STATISTICS MANAGEMENT", U.S. Pat. No. 7,412,439, issued Aug. 12, 2008, having application Ser. No. 10/752,915, filed Jan. 7, 2004, the entire contents of which is incorporated herein by reference.

BACKGROUND OF THE INVENTION

1. Field of the Invention

The present invention is related to statistics management.

2. Description of the Related Art

A database system is one in which data is stored, retrieved, and processed. Data records in a relational database management system (RDBMS) in a computer are maintained in tables, which are a collection of rows all having the same columns. Each column maintains information on a particular type of data for the data records which comprise the rows. Tables in the database are searched using, for example, a Structured Query Language (SQL), which specifies search operations or predicates to perform on columns of tables in the database to qualify rows in the database tables that satisfy the search conditions.

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

The database system typically stores statistics that may be useful for database processing. Statistics deficiencies, however, lead to poor performance of a SQL query. An RDBMS relies on statistical information residing in a system catalog to choose an access path for a SQL query. An access path may be described as a technique that is selected by an RDBMS optimizer for retrieving data from a database (e.g., an access path can involve the use of an index, a sequential scan, or a combination of the two) or as a path that is used to locate data that is specified in SQL statements. For the statistical information to be useful, the statistical information should be sufficient, consistent, and timely. However, there exist several statistics deficiencies that often cause a sub-optimal access path to be chosen. Some common categories of statistics deficiencies include: missing statistics, conflicting statistics, and obsolete/volatile statistics. Obsolete statistics refer to statistics that do not reflect the current state, while volatile statistics refer to statistics for data that changes often, which requires these statistics to be recollected frequently.

The missing statistics category represents query statistics that do not exist in the system catalog. The term "query statistics" may be described as statistics used to generate an efficient access path for execution of the query. Query statistics include, for example: table statistics, index statistics, column statistics (e.g., uniform distribution, non-uniform distribution, and distribution over range), and multiple column statistics (e.g., uniform distribution, non-uniform distribution, distribution over range, and correlation). Distribution statistics address data skew, while multi-column cardinality statistics address correlation.

The conflicting statistics category represents query statistics that exist in the system catalog, but for which there is some conflict between statistics.

The obsolete and/or volatile statistics category represents query statistics that exist in the system catalog, but for which the statistical information does not reflect the current status of the data. Because obsolete statistics do not portray data in the database accurately, obsolete statistics may lead to selection of a less efficient access path than if statistics were not available at all.

Traditionally, a database administrator (DBA) could periodically collect statistics for tables, indexes, and maybe some identified interesting columns and column groups (i.e., group of columns) for a database. When a DBA encounters a long running query, the DBA then may perform the following tasks manually: analyze the query; attempt to find all query statistics; check whether all query statistics exist in the system catalog; attempt to collect any missing statistics; check whether existing query statistics conflict with each other, and, if so, recollect these statistics to avoid conflicts; and, check whether obsolete statistics exists and, if so, either recollect or remove these statistics, depending on whether the obsolete statistics are needed. Some drawbacks of this manual approach are that the tasks are time-consuming and require a DBA to have specific knowledge in query tuning and about the specific optimizer. For a complex query, it may take hours or even days for an experienced DBA to manually perform statistics analysis. Moreover, because the process is complicated, it is unreasonable to expect a novice DBA to perform this activity correctly. Also, a DBA performs statistics analysis in a reactive way. Because the queries are becoming more and more complex in database environments, it is very difficult for DBAs to apply this manual approach in a database system (e.g., a production system). Moreover, oftentimes the manual effort to determine which statistics should be collected is prohibitive and complete and accurate statistics are often not collected, which leaves conventional optimizers to make optimization decisions with incomplete statistics.

The Microsoft® SQL Server™ 2000 product, available from Microsoft Corporation, stores statistical information regarding the distribution of values in indexed columns and for columns without indexes that are used in a predicate. The Microsoft® SQL Server™ 2000 product also indicates out-of-date or missing statistics as warnings. The Microsoft® SQL Server™ 2000 product updates statistical information periodically as the data in tables changes. This approach only eases some preliminary statistics deficiency problems. There are several drawbacks to the Microsoft® SQL Server™ 2000 product. For example, the Microsoft® SQL Server™ 2000 product does not take conflicting statistics into consideration. Additionally, the Microsoft® SQL Server™ 2000 product does not fully cover query statistics, such as multiple column related statistics. Multiple column related statistics are important because performance bottlenecks usually come from multiple column related statistics deficiencies for complex queries.

Thus, there is a need for improved statistics management.

SUMMARY OF THE INVENTION

Provided are a method, system, and program for maintaining statistics. A query is received. Column group generation is performed to form one or more column groups. Column group refinement is performed based on statistics data generated for a previously received query. A statistics check is automatically performed. A statistics collection command is generated to obtain statistics.

BRIEF DESCRIPTION OF THE DRAWINGS

Referring now to the drawings in which like reference numbers represent corresponding parts throughout:

FIGS. 3A and 3B illustrate further details of logic implemented in a statistics advisor in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention provide techniques for identification, consistency checking, correction, and consolidation of statistics for query optimization. Implementations of the invention receive a query and existing statistics at a first time, and generate a statistics collection command to obtain existing statistics at a second time, which may include revised or additional statistics. That is, implementations of the invention review statistics that are presently stored. If the presently stored statistics are not complete, accurate, and/or current, implementations of the invention generate a statistics collection command to retrieve improved statistics. Also, if the presently stored statistics include a certain set of statistics (e.g., column cardinality statistics on every column), implementations of the invention may start with an advanced analysis (e.g., determining whether correlation and/or skew are required). If the presently stored statistics do not include a certain set of statistics (e.g., column cardinality statistics) or these statistics are inconsistent, then implementations of the invention may retrieve improved statistics before performing the advanced analysis.

Figure 1:
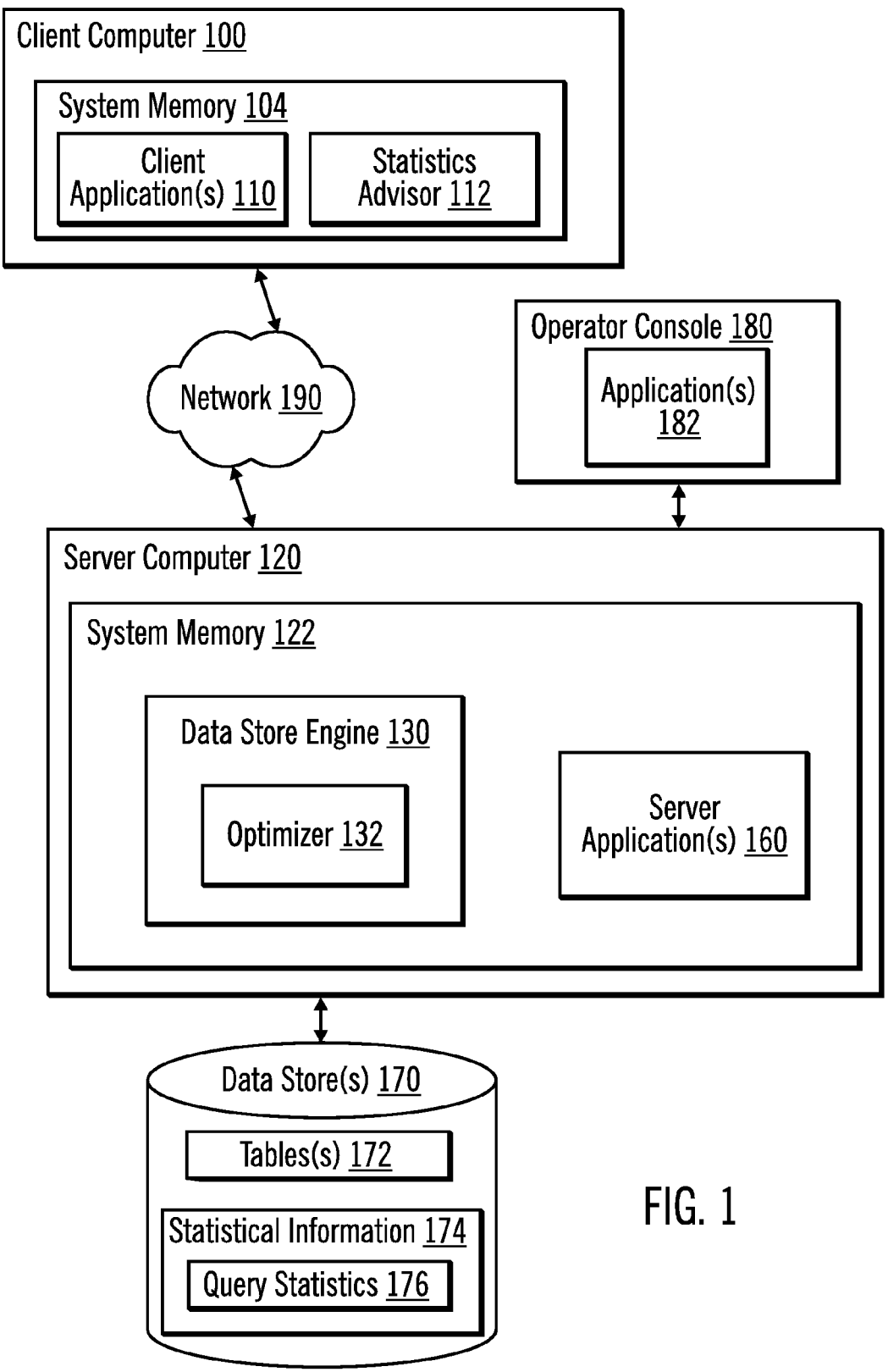
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc.

The client computer 100 includes system memory 104, which may be implemented in volatile and/or non-volatile devices. One or more client applications 110 may execute in the system memory 104. Additionally, a statistics advisor 112 executes in system memory 104 to provide advice on statistics. In certain implementations, the statistics advisor 112 provides a Graphical User Interface (GUI) through which a user (e.g., a DBA) interacts with the system advisor 112.

The server computer 120 includes system memory 122, which may be implemented in volatile and/or non-volatile devices. A data store engine 130 executes in the system memory 122. The data store engine 130 includes an optimizer 132 that may be used to generate an access path for executing a query. In certain implementations, the data store engine 130 is an RDBMS. One or more server applications 160 execute in the system memory 122.

The server computer 120 provides the client computer 100 with access to data (e.g., tables 172 and statistical information 174) in one or more data stores 170 (e.g., databases). Query statistics 176 for a specific query typically refer to a subset of the statistical information 174. In particular, query statistics are those statistics that are useful for optimization of a specific query. For example, in data store 170, there may be 10,000 tables and 20,000 indexes, but a specific query may reference 3 tables and with 5 indexes. So the query statistics are a subset of available statistics based on the objects referenced in the specific query. Furthermore, there may be 300 columns in the three tables. For each column and column group, the statistics advisor 112 may collect column cardinality, multi-column cardinality, frequencies to address point skew, histograms to address skew on a range, and/or multi-column cardinality on a column group to address column correlation. Implementations of the invention identify specific columns, column groups, and the type of statistic to collect on a column and/or column group from the available statistics for the data store 170. Although a single data store 170 is illustrated for ease of understanding, one or more tables 172, statistical information 174, and other data in data store 170 may be stored in data stores at other computers connected to server computer 120.

Also, an operator console 180 executes one or more applications 182 and is used to access the server computer 120 and the data store 170. Although tables 172 are referred to herein for ease of understanding, other types of structures may be used to hold the data that is described as being stored in tables 172.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes tables 172 that are used with implementations of the invention.

Figure 2A:
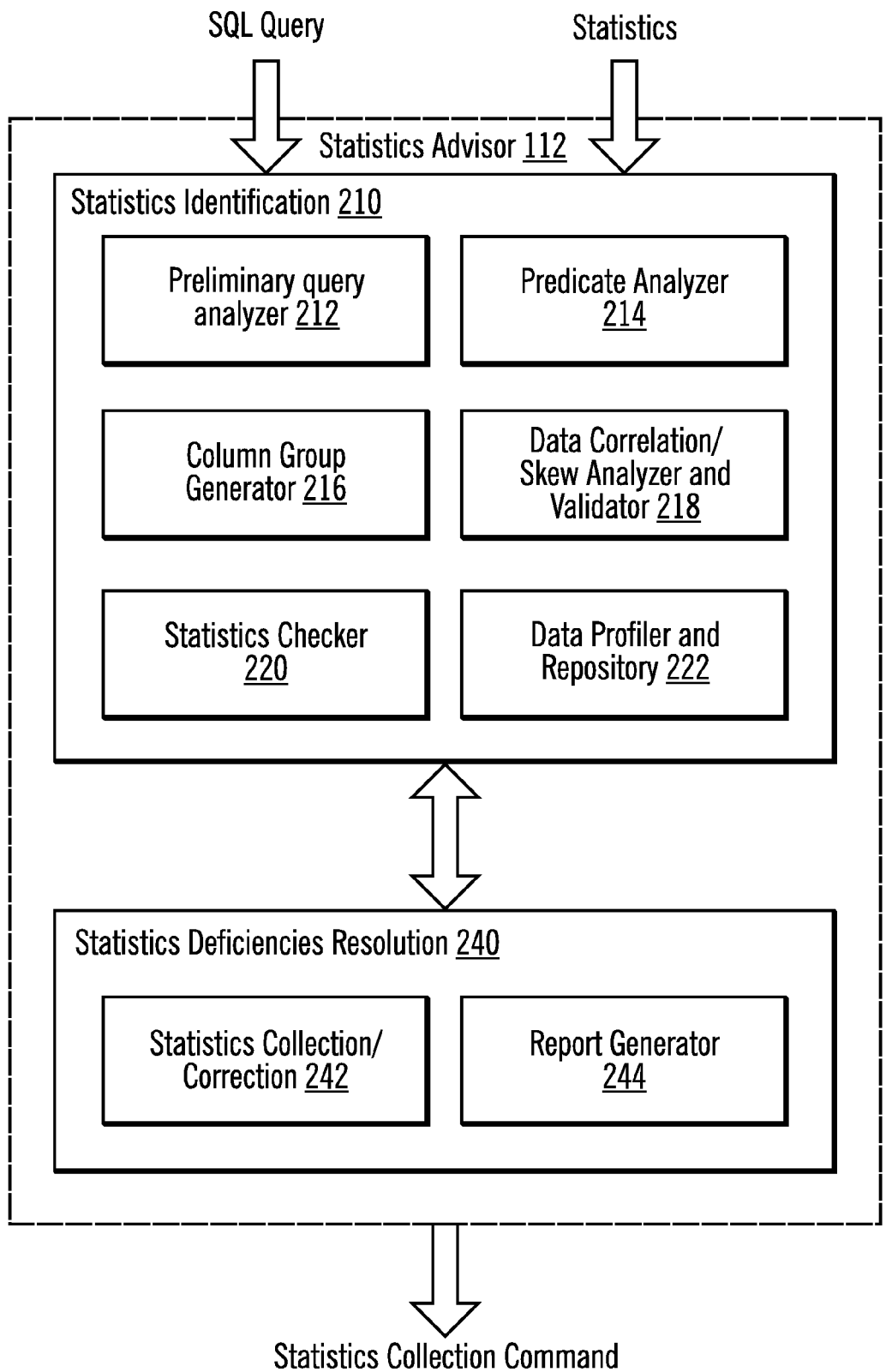
FIG. 2A illustrates, in a block diagram, further details of a statistics advisor and in accordance with certain implementations of the invention.

FIG. 2A illustrates, in a block diagram, further details of a statistics advisor 112 and in accordance with certain implementations of the invention. The statistics advisor 112 includes a statistics identification component 210 and a statistics deficiencies resolution component 240.

The statistics identification component 210 includes the following modules: a preliminary query analyzer 212, a predicate analyzer 214, a column group generator 216, a data correlation/skew analyzer and validator 218, a statistics checker 220, and a data profiler and repository 222.

The preliminary query analyzer 212 identifies related data store objects, such as tables and indexes, etc. The predicate analyzer 214 performs predicate analysis, classifies predicates, and identifies interesting columns. In certain implementations, interesting columns are those columns referenced in one or more predicates.

The column group generator 216 generates and refines column groups based on the results of the predicate analyzer 214. That is, the columns may be grouped with reference to a predicate based on some rule. The following is a sample query (1) illustrating multi-column grouping in accordance with certain implementations of the invention.

```
SELECT T1.*                    Sample Query (1)
FROM T1, T2
WHERE T1.C1 = T2.C1
    AND T1.C2 = T2.C2
```

-continued

```
AND T1.A = 1
AND T1.B = 2
AND T1.F = 3;
```

For query (1), table T1 has index I1 on columns (A,B,C,D). Table T1 is joined to table T2. The tables are equi-joined on columns T1.C1=T2.C1 and T1.C2=T2.C2. So table T1 has join column group (C1,C2), and table T2 has join column group (C1,C2). It is useful to have a multi-column cardinality to use as a lower bound for join size estimation. Without a multi-column cardinality, the optimizer 132 would not know whether join columns C1 and C2 of table T1 are correlated or independent. The same is true for join columns C1 and C2 of table T2. Therefore, when there exists a multi-column join between two tables, it is useful to have a multi-column cardinality on those column groups.

In this example, Table T1 equals literal column group (A,B,F) (i.e., to accurately estimate number of rows from table T1, it would be useful to have cardinality and maybe frequencies on this group). Index I1 has column group (A,B) (i.e., to accurately estimate index cost, it would be useful to have cardinality and maybe frequencies on this group).

The data correlation/skew analyzer and validator 218 analyzes and/or validates possible data correlation/skew. Data correlation may be described as relating to relationships between a value of one column and a value of another column. Data skew may be described as relating to the distribution of values within a table. For instance, in a customer table that has a column for region, state, and zipcode, there may be many more customers within one region, state, and/or zip code than another. That is, the customers may not be uniformly distributed across the regions, states, and/or zipcodes. When a SQL statement that is selecting customers from a specific set of zip codes is issued, it is useful to understand this distribution to build an effective plan for retrieving the data.

The statistics checker 220 determines whether query statistics are missing, conflicting, obsolete and/or volatile and generates a statistics collection command to obtain existing statistics based on the determination.

The data profiler and repository 222 stores the results of the query analysis and consolidates the results. In particular, the data profiler and repository 222 enables the statistics advisor 112 to be adaptive. The statistics advisor 112 learns from previous executions. The statistics advisor 112 identifies columns as potentially correlated and potentially skewed. Then, statistics are collected and a degree of correlation and skew are known. The data profiler and repository 222 learns that two columns are either correlated or independent and stores this data. The data profiler and repository 222 also recognizes that a column is point skewed and/or range skewed or is uniformly distributed and stores this data. Thus, the statistics advisor 112 has more data for subsequent query processing than for early executions. Also, from a point skew perspective, a column may be non-uniformly distributed or uniformly distributed, while from a correlation perspective, a column may be correlated or independent.

For example, consider column MONTH_YEAR. If a column has low column cardinality relative to table cardinality, then the statistics advisor 112 recommends collection of non-uniform distribution statistics because columns with this characteristic are often skewed. For this example, presume that column MONTH_YEAR has low column cardinality relative to table cardinality. Upon collection of this statistic, the data profiler and repository 122 determines that the column is uniformly distributed. Since the MONTH_YEAR column is uniformly distributed, and the data values for MONTH_YEAR column are subject to change frequently (e.g., adding a new month of data or removing an old month of data causes statistics to become obsolete), the data profiler and repository 122 is able to suggest that non-uniform distribution statistics not be collected. The data profiler and repository 122 is updated to indicate that this column is uniformly distributed and to suppress the collection of non-uniform distribution statistics. So the data profiler and repository 122 is the "learning" component of the statistics advisor 112. With such adaptive learning, implementations of the invention do not repeatedly suggest that the user collect statistics that may not be useful or to collect statistics that are known from previous query processing to be useful.

As another example, if a query is analyzed, and data correlation is found for column groups, then, this statistics data is stored. Then, if another query is received with the same column groups, then implementations of the invention recognize that these column groups are correlated. Also, if a query is analyzed and no data correlation is found for the column groups in the query, then another query is received with a subset of column groups, implementations of the invention recognize that the subset of column groups are not correlated.

The statistics deficiencies resolution component 240 includes the following modules: a statistics collection/correction module 242 and a report generator 244. The statistics collection/correction module 242 executes statistics collection and/or correction statements (i.e., "statistics collection commands"). The report generator 244 generates preliminary and advanced reports.

The framework provided by implementations of the invention is based on general statistical characteristics. In certain implementations, some modules, such as the predicate analyzer 214 and statistics collection/correction module 242, may use characteristics of a specific data store engine 130 optimizer 132.

Figure 2B:
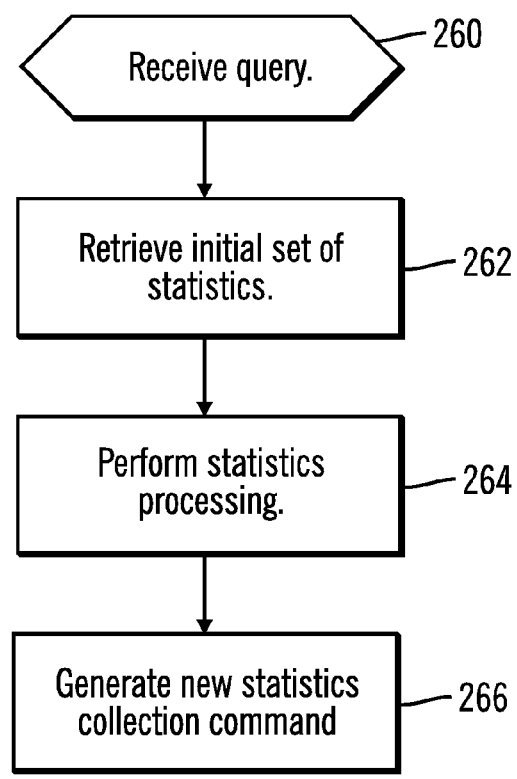
FIG. 2B illustrates logic implemented in a statistics advisor in accordance with certain implementations of the invention.

FIG. 2B illustrates logic implemented in a statistics advisor 112 in accordance with certain implementations of the invention. Control begins at block 260 with the statistics advisor 112 receiving a query (e.g., a SQL query) as input. In block 262, the statistics advisor 112 may then call the data store engine 130 to retrieve an initial set of statistical information 174 that are stored, for example, in data store 170. In block 264, the statistics advisor performs statistics processing (e.g., determining whether there are missing, conflicting, obsolete, and/or volatile statistics).

In block 266, the statistics advisor 112 generates a new statistics collection command. In particular, the statistics advisor 112 generates information used by a statistics collection command to obtain existing statistics and outputs the statistics collection command. One example of a statistics collection command is a RUNSTATS command that is input to a RUNSTATS utility for a DB2® system available from International Business Machines Corporation. The statistics advisor 112 is able to use any interface or mechanism provided by any data store system vendor to collect statistics, and, therefore, the statistics advisor 112 is able to output the appropriate statistics collection command to obtain statistics for various data store systems.

In certain implementations, a user is asked to execute the statistics collection command, and in certain other implementations, the statistics advisor 112 automatically executes the statistics collection command. Execution of the statistics collection command stores statistics 176 obtained for the query in data store 170. Then, the data store engine 130 optimizer 132 uses these improved statistics when executing a query.

The following is a sample query (2) that may be input to the statistics advisor 112 in accordance with certain implementations of the invention.

```
SELECT C.NAME, O.STATUS, O.DATE                Sample Query (2)
FROM CUSTOMER C, ORDER O
WHERE
    C.ID = O.CUST_ID       AND
    C.STATE = 'CA'         AND
    C.CITY = 'SAN JOSE'    AND
    O.AMOUNT = -1          AND
    EXISTS ( SELECT 1 FROM ORDER_ITEM I WHERE
        O.ID = I.ORD_ID    AND
        I.IN_STOCK = 'N');
```

The following is a sample statistics collection command (1) that may be output by the statistics advisor 112 to obtain statistics when some statistics are found to be missing, conflicting, obsolete and/or volatile for sample query (1) in accordance with certain implementations of the invention.

```
                                              Sample Command (1)
RUNSTATS TABLESPACE DSNDB04.CUSTOMER
    TABLE(CUSTOMER)
        COLUMN(ID, STATE, CITY) INDEX(INDEX1)
        INDEX1 (CITY, STATE) ON CUSTOMER
```

For this example, assume that for query (1), the filtering of the predicate C.STATE='CA' is about 0.02, and the filtering of the predicate C.CITY='SAN JOSE' is about 0.0001. If the columns C.STATE and C.CITY are independent, the total filtering would be $2*10^{-6}$. Also assume that generally STATE and CITY are closely correlated, and the actual filtering should be approximately $10^{-5}$. However, without data correlation information collected, the data store engine 130 optimizer 132 assumes they are independent, and, thus, underestimates the number of rows returned from CUSTOMER table.

On the other hand, assume that a company encounters a severe supply chain problem, and over 50% of orders cannot be fulfilled. For this example, when an order cannot be fulfilled, the data store engine 130 puts a default value -1 in the AMOUNT column of the ORDER table. As a result, there is data skew on the AMOUNT column with respect to the default value -1, and the actual filtering of the predicate O.AMOUNT=-1 is over 0.5. However, again, without data skew information collected, the data store engine 130 optimizer 132 assumes uniform distribution and obtains a much lower estimate of the filtering.

Thus, the statistics advisor 112 automatically detects such problems and generates a command, such as statistics collection command (1), to obtain the appropriate statistics. Then, the data store engine 130 is able to optimize query execution using the statistics.

Figure 3B:
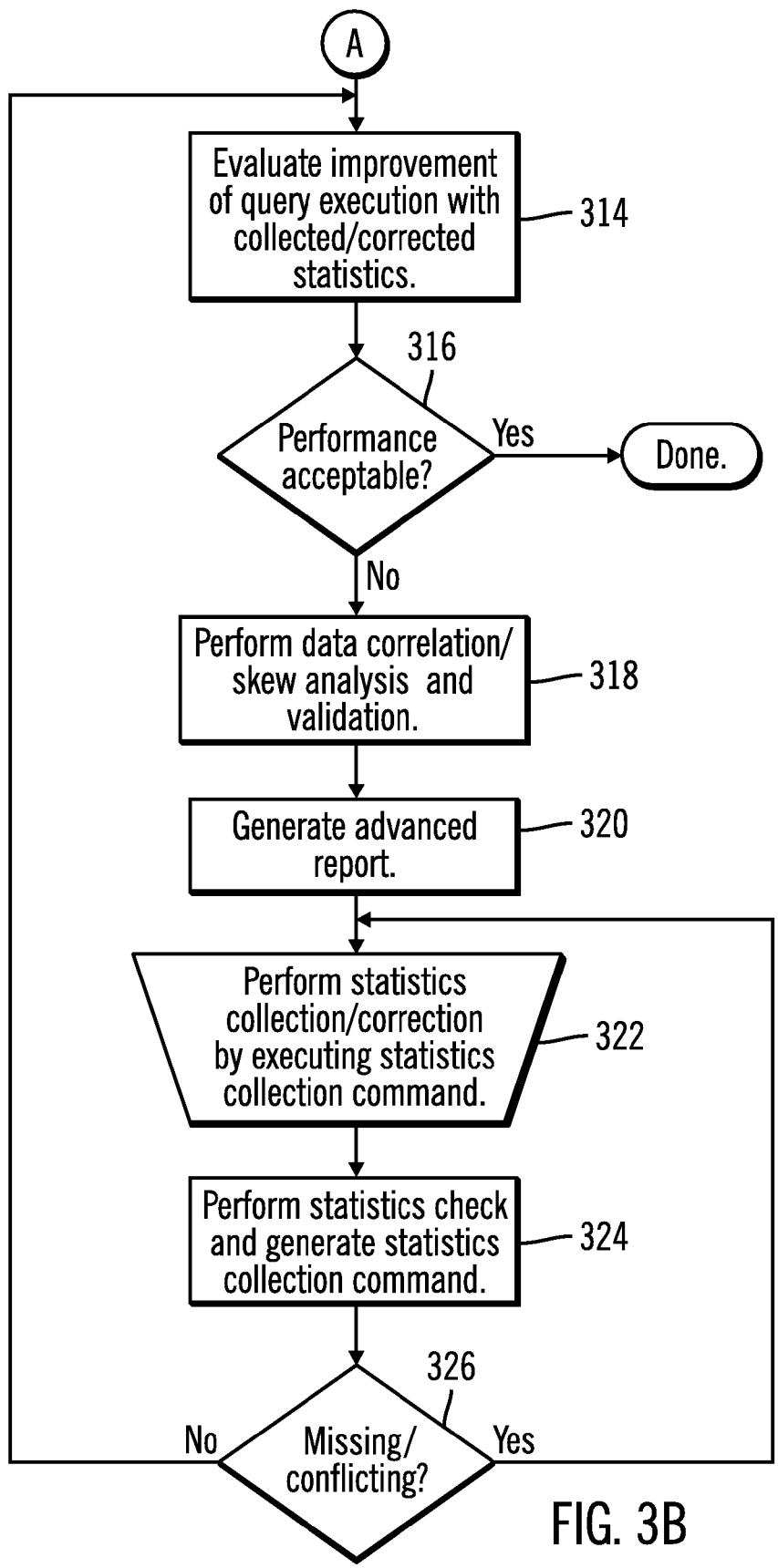

FIGS. 3A and 3B illustrate logic implemented in the statistics advisor 112 in accordance with certain implementations of the invention. During a preliminary analysis phase, preliminary query analysis, predicate analysis, column group generation/refinement, and one or more statistics checks are performed, and then a preliminary report is generated.

In FIG. 3A, control begins at block 300 with the statistics advisor 112 performing preliminary query analysis and predicate analysis. When performing preliminary query analysis and predicate analysis on a query, the statistics advisor 112 identifies related data store objects, classifies predicates, and identifies interesting columns (e.g., columns used in some predicates). These predicates may be described as those that the data store engine 130 optimizer 132 is able to process more efficiently.

In block 302, the statistics advisor 112 performs column group generation/refinement. Column group generation may be described as identifying columns that may be grouped together based on some rule. Refinement may be described as checking the data profile repository 222 for statistics data stored for one or more previous queries that may be used in processing the current query. The statistics advisor 112 performs column group generation and refinement to produce interesting column groups (multiple columns). Through the processing of blocks 300 and 302, many statistics have already been identified, including, for example, table, index, and interesting column statistics, as well as some multi-column statistics.

In block 304, the statistics advisor 112 performs a statistics check and generates a statistics collection command. For missing statistics, the statistics advisor 112 is aware of which statistics should be available for a particular query, and, if these are not available, the statistics advisor 112 recognizes that the statistics are missing. For conflicting statistics, the statistics advisor 112 has a set of constraints that should be met by the statistics, and, if these constraints are not met, the statistics advisor 112 recognizes that the statistics conflict. For obsolete and/or volatile statistics, the statistics advisor applies heuristic rules to determine whether the statistics are obsolete or volatile.

For example, if a filter factor is very low, then the statistics advisor 112 may determine that the statistics are obsolete. As another example, the statistics advisor 112 evaluates literal values within predicate. If domain statistics are available and the literal value is determined to be outside of a domain, then the statistics advisor 112 determines that the statistics are likely obsolete. When the number of frequencies is equal to the column cardinality, frequency statistics are considered domain statistics, as the domain of values is considered known. For example, HIGH2KEY and LOW2KEY determine the high and low range of values within the domain. So, if a value is not one of the stored frequencies and the number of frequencies is equal to column cardinality, the statistics advisor 112 determines that the statistics on that column are likely obsolete. If a range predicate looks for a range of values outside of the high2key/low2key range, then the statistics advisor 112 determines that the statistics on the column are likely obsolete.

In block 306, the statistics advisor 112 generates a preliminary report. The preliminary report includes, for example, a statistics collection command that was generated by the statistics advisor 112, reasons for collecting existing statistics using the statistics collection command, and a report on missing, conflicting, obsolete, and/or volatile statistics.

In block 308, the statistics advisor 112 performs statistics collection and/or correction, if needed (i.e., if the statistics check in block 304 determined that statistics collection was needed), by executing the statistics collection command. Statistics collection and/or correction may be performed by executing the statistics collection command that was generated by the statistics advisor 112. Note that the statistics collection command may have been generated from block 304 or 310.

In block 310, the statistics advisor 112 performs another statistics check, if needed, and generates a statistics collection command. In block 312, if there are missing and/or conflicting statistics, processing loops back to 308 for recollection of statistics, otherwise, processing continues to block 314 (FIG.

3B). That is, through blocks 304-312, the statistics advisor 112 performs a statistics check and performs, if needed collection and, in some cases, recollection of statistics to eliminate any missing and conflicting statistics deficiencies found so far.

During an advanced analysis phase, iterative data correlation/skew analysis and validation, adaptive learning of data profiles (i.e., using stored statistics data from a previous query for a current query), and one or more statistics checks are performed, and then an advanced report is generated.

In block 314, query execution improvement is evaluated. In particular, the query is executed using the collected and/or corrected statistics. In certain implementations, a user may make a judgment about whether query execution has improved. In certain other implementations, when the query has been executed multiple times, each time with different statistics, query execution improvement is judged by comparing execution data for the different query executions.

In block 316, if performance is acceptable, processing is done, otherwise, processing continues to block 318. In certain implementations, improvement is acceptable if certain policies and/or standards are met. In certain other implementations, whether improvement is acceptable is based on a user's acceptance decision. If performance is not acceptable, then implementations of the invention continue to iteratively perform data correlation/skew analysis and validation to exploit statistics related to multi-columns.

In block 318, the statistics advisor 112 performs data correlation/skew analysis and validation. Initially, one or more heuristic rules may be applied to help identify potential data correlation/skew. Sample rules (1), (2), (3), and (4) are examples of heuristic rules for a predicate in accordance with certain implementations of the invention.

| | |
|---|---|
| WHERE C1 = ' ' | Sample Rule (1) |
| WHERE T1.C1 = T2.C1 AND T1.C2 = T2.C2 | Sample Rule (2) |
| WHERE GENDER = ? | Sample Rule (3) |
| WHERE ACCT_NO = ? AND SSN = ? | Sample Rule (4) |

In sample rule (1), the blank is considered a typical default value. The statistics advisor 112 recognizes that data skew often occurs on known default values, nulls, and Data Definition Language (DDL) defined default values. So the statistics advisor 112 looks for default values used as literal values in predicates and makes a specific statistics suggestion to ensure non-uniform distribution statistics are collected on that column.

In sample rule (2), if there is no index on either table T1 or T2, the statistics advisor 112 recognizes that the optimizer 132 benefits from correlation statistics to estimate join size. If no index exists, often multi-column cardinality does not exist. So the statistics advisor 112 looks for and ensures that multi-column cardinality (i.e., correlation statistics) are collected for all join column groups.

In sample rule (3), presume that GENDER has a column cardinality of 2, and the table has a cardinality of 1 million. The statistics advisor recognizes that columns with low column cardinality relative to table cardinality often have non-uniform data distribution. So the statistics advisor 112 suggests collection of non-uniform distribution statistics on this value.

In sample rule (4), presume that the table has 1 million rows, column ACCT_NO has a column cardinality of 700, 000, and SSN has a column cardinality of 500,000. The product of the column cardinalities 500,000*700,000 is greater than the table cardinality. As the product of the column cardinalities approaches or exceeds table cardinality, it is either highly probable or certain that the columns are correlated. So the statistics advisor 112 suggests correlation statistics.

Then, if, for example, a column group is identified as non-correlated, the statistics advisor 112 does not collect multi-column cardinality, regardless of volatility of the statistics. On the other hand, if a column group is identified as correlated, the statistics advisor 112 collects multi-column cardinality when this information is missing, conflicting, obsolete, and/or volatile. The rationale to consider obsolete and/or volatile statistics after the processing of block 312 is to limit the amount of resources initially spent on statistics collection and to initially collect enough statistics to improve the query performance to an acceptable level, if possible.

Also, the statistics advisor 112 may ask a user to provide information on data skew or correlation based on domain knowledge via, for example, a GUI. Additionally, statistics data on data correlation/skew for one query may be stored in data profile repository 112 for reuse with other queries. For example, if a user provides information that there is data skew for a particular table referenced in a predicate in the query, then this statistics data is stored, and when another query with the same predicate is received, the statistics advisor 112 recognizes that the table is skewed. In addition to identifying certain query statistics, the result of the data correlation/skew analysis may also be used to correct some obsolete and/or volatile statistics problems. For example, if a column is found to be uniform after validation, then the statistics advisor 112 alerts the user if non-uniform statistics of this column exist for a while as they may be obsolete.

In block 320, the statistics advisor generates an advanced report. In addition to the information contained in the preliminary report, the advanced report includes, for example information on additional statistics that may not have been included in the preliminary report.

In block 322, the statistics advisor 112 performs statistics collection and/or correction, if needed (i.e., if the data correlation/skew analysis and validation in block 318 determined that statistics collection was needed), by executing a statistics collection command. Statistics collection and/or correction may be performed by executing the statistics collection command that was generated by the statistics advisor 112.

In block 324, the statistics advisor 112 performs another statistics check, if needed, and generates a statistics collection command. In block 326, if there are missing and/or conflicting statistics, processing loops back to 322 for recollection of statistics, otherwise, processing continues to block 314 (FIG. 3B). That is, through blocks 322-326, the statistics advisor 112 performs, if needed, collection and, in some cases, recollection of statistics to eliminate any missing and conflicting statistics deficiencies found so far.

Thus, the statistics advisor 112 identifies columns and column groups for collection, and generates a statistics collection command. The statistics collection command may be defined by a statistics collection mechanism. For example, the statistics collection command for DB2® for z/OS® is the RUNSTATS statement and is generated according to the RUNSTATS specification. Other vendors may provide statistics collection mechanisms for DB2® for z/OS® or for other RDBMSs. The statistics advisor is capable of generating a statistics collection commands for any vendor and for any RDBMS. Thus, the statistics advisor 112 determines what to collect and follows appropriate collection mechanism syntax to generate appropriate statistics collection commands. The syntax for the commands is predetermined by the statistics collection mechanism based on specifications for the command for a specific vendor and/or RDBMS.

Additionally, implementations of the invention use related statistics data from the data profile repository 222. If interesting columns or column groups are already known or can be inferred from whether they are correlated/skewed or not, then further validation tasks may be avoided. On the other hand, if validation is performed at this stage, then the results are saved into the data profile repository.

Iterative processing of statistics is performed because data correlation/skew analysis and validation are expensive processes and it may be beneficial to perform such tasks gradually and because the user may have domain knowledge that may be helpful in certain decisions of this process. In each iteration, statistics identified so far are checked to determine whether there are any missing, conflicting, or obsolete statistics. Then, actions are taken to fix the statistics deficiencies. In certain implementations, this iterative process may be continued until either the improvement is acceptable or no statistics deficiencies are found. In certain alternative implementations, the iterative process of FIGS. 3A and 3B may be performed for a specified number of iterations.

Thus, implementations of the invention provide an effective and efficient framework to automatically and/or semi-automatically (e.g., with user intervention) solve statistics deficiencies and hence improve the performance of a query. Implementations of the invention cost-effectively identify various kinds of statistics (e.g., table, index, column, and multi-column). Also, implementations of the invention integrate predicate information, statistical information, and underlying cost model information to increase the accuracy and efficiency of statistics identification. Implementations of the invention progressively find statistics iteratively to minimize overhead (i.e., finding a large amount of statistics at once may take a large amount of overhead, so certain implementations find sets of statistics). That is, the universe of statistics for a query may be very large and expensive to collect. Therefore, implementations of the invention initially identify a first set of statistics that are likely to improve the query execution. Then, on subsequent iterations of determining whether performance is acceptable, implementations of the invention may obtain a second set of statistics. Therefore, for queries that do not need more than the first set of statistics, the additional processing resources are saved.

Implementations of the invention adaptively learn statistics based on the results of previous query analyses (i.e., data profiles of queries are stored in a data profile repository for use with subsequent queries).

Also, implementations of the invention cost-effectively accommodate various kinds of statistics deficiencies (e.g., missing, conflicting, obsolete, and/or volatile). Implementations of the invention adopt heuristic rules to help identifying statistics deficiencies. Implementations of the invention iteratively correct statistics deficiencies to minimize overhead by recollecting statistics as needed.

Implementations of the invention provide portability between different relational database management systems (RDBMSs) or different versions of the same RDBMS (i.e., any type of statistics collection command may be generated for use with different RDBMSs or different version of an RDBMS). Implementations of the invention are adaptable to different vendors' products or different versions of the same RDBMS to conform to specific optimizers.

IBM and DB2 are a registered trademarks or common law marks of International Business Machines Corporation in the United States and/or other countries. Microsoft and SQL Server are registered trademarks or common law marks of Microsoft Corporation in the United States and/or other countries.

Additional Implementation Details

The described techniques for statistics management may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2B, 3A, and 3B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2B, 3A, and 3B may be implemented in software, hardware, programmable and non-programmable gate array logic or in some combination of hardware, software, or gate array logic.

Figure 4:
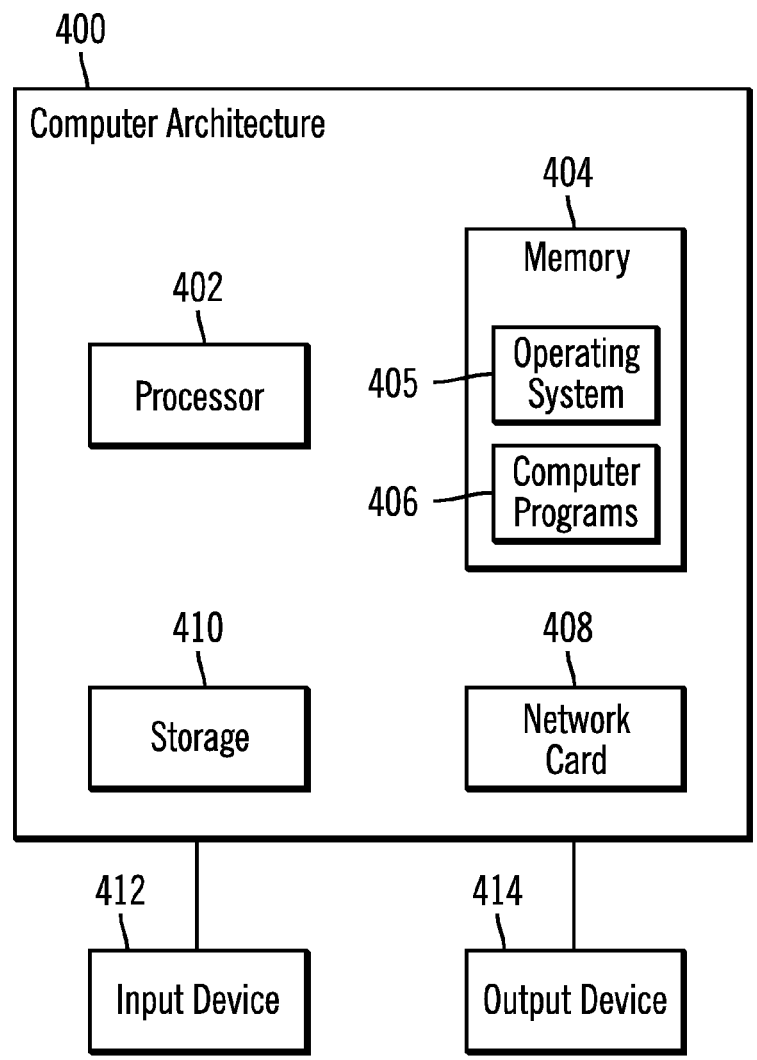
FIG. 4 illustrates an architecture of a computer system that may be used in accordance with certain implementations of the invention.

FIG. 4 illustrates an architecture of a computer system that may be used in accordance with certain implementations of the invention. Client computer 100, server computer 120, and/or operator console 180 may implement computer architecture 400. The computer architecture 400 may implement a processor 402 (e.g., a microprocessor), a memory 404 (e.g., a volatile memory device), and storage 410 (e.g., a non-volatile storage area, such as magnetic disk drives, optical disk drives, a tape drive, etc.). An operating system 405 may execute in memory 404. The storage 410 may comprise an internal storage device or an attached or network accessible storage. Computer programs 406 in storage 410 may be loaded into the memory 404 and executed by the processor 402 in a manner known in the art. The architecture further includes a network card 408 to enable communication with a network. An input device 412 is used to provide user input to the processor 402, and may include a keyboard, mouse, pen-stylus, microphone, touch sensitive display screen, or any other activation or input mechanism known in the art. An output device 414 is capable of rendering information from the processor 402, or other component, such as a display monitor, printer, storage, etc. The computer architecture 400 of the computer systems may include fewer components than illustrated, additional components not illustrated herein, or some combination of the components illustrated and additional components.

The computer architecture 400 may comprise any computing device known in the art, such as a mainframe, server, personal computer, workstation, laptop, handheld computer, telephony device, network appliance, virtualization device, storage controller, etc. Any processor 402 and operating system 405 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A computer readable medium including a program for maintaining statistics, wherein the computer readable medium is a member of a set of computer readable media consisting of a magnetic storage medium, optical storage, and volatile and non-volatile memory devices, wherein the program, when executed by a computer, causes operations to be performed, the operations comprising:
    receiving a query;
    performing column group generation to form one or more column groups;
    performing column group refinement based on statistics data generated for a previously received query;
    automatically performing a statistics check by determining whether the statistics include missing statistics, conflicting statistics, obsolete statistics, and volatile statistics;
    automatically generating a statistics collection command to obtain the statistics based on the determination, wherein the statistics collection command identifies the missing statistics based on recognizing which of the statistics should be available for a particular query and are not available, identifies the conflicting statistics based on whether a set of constraints are met by the statistics, and identifies the obsolete statistics and the volatile statistics by applying heuristic rules to determine whether each of the statistics are at least one of obsolete and volatile;
    executing the statistics collection command to obtain improved statistics that are stored in a data store;
    iteratively performing the statistics check, generating the statistics collection command, and executing the statistics collection command until performance of execution of the query with the improved statistics is acceptable; and
    generating at least one of a preliminary report and an advanced report that includes the generated statistics collection command, wherein the preliminary report is generated in a preliminary analysis phase and includes the statistics collection command, reasons for collecting existing statistics using the statistics collection command, and a report on missing, conflicting, obsolete, and volatile statistics, and wherein the advanced report is generated in advanced analysis phase based on iterative data correlation, skew analysis, and validation, adaptive learning of data profiles using stored statistics data from the previous query, and performing one or more additional statistics checks.

2. The article of manufacture of claim 1, wherein the operations for performing column group refinement further comprise:
    determining whether one or more columns in the query are the same as one or more columns in the previously received query; and
    when it is determined that the one or more columns are the same,
        retrieving stored statistics data for the previously received query; and
        using the retrieved statistics data for the query.

3. The article of manufacture of claim 1, wherein the operations further comprise:
    performing at least one of preliminary query analysis and predicate analysis to obtain the statistics, wherein the preliminary query analysis comprises identifying related data store objects including tables and indexes, and wherein the predicate analysis comprises predicate analysis, classification of predicates, and identification of columns that are referenced in one or more of the predicates.

4. The article of manufacture of claim 1, wherein the operations further comprise:
    iteratively performing the statistics check to determine whether existing statistics are at least one of missing, conflicting, obsolete, and volatile.

5. The article of manufacture of claim 4, wherein the statistics collection command is generated based on the statistics check.

6. The article of manufacture of claim 1, wherein the operations further comprise:
    executing the query using the improved statistics; and
    determining whether execution performance of the query is acceptable.

7. The article of manufacture of claim 1, wherein the operations further comprise:
    performing at least one of data correlation and data skew analysis to generate the statistics data that indicates whether columns are correlated or independent and whether columns are point skewed, range skewed or uniformly distributed.

8. A system for maintaining statistics, comprising:
    a processor;
    means for receiving a query;
    means for performing column group generation to form one or more column groups;
    means for performing column group refinement based on statistics data generated for a previously received query;
    means for automatically performing a statistics check by determining whether the statistics include missing statistics, conflicting statistics, obsolete statistics, and volatile statistics;
    means for automatically generating a statistics collection command to obtain the statistics based on the determination, wherein the statistics collection command identifies the missing statistics based on recognizing which of the statistics should be available for a particular query and are not available, identifies the conflicting statistics based on whether a set of constraints are met by the statistics, and identifies the obsolete statistics and the volatile statistics by applying heuristic rules to determine whether each of the statistics are at least one of obsolete and volatile;

means for executing the statistics collection command to obtain improved statistics that are stored in a data store;

means for iteratively performing the statistics check, generating the statistics collection command, and executing the statistics collection command until performance of execution of the query with the improved statistics is acceptable; and means for generating at least one of a preliminary report and an advanced report that includes the generated statistics collection command, wherein the preliminary report is generated in a preliminary analysis phase and includes the statistics collection command, reasons for collecting existing statistics using the statistics collection command, and a report on missing, conflicting, obsolete, and volatile statistics, and wherein the advanced report is generated in advanced analysis phase based on iterative data correlation, skew analysis, and validation, adaptive learning of data profiles using stored statistics data from the previous query, and performing one or more additional statistics checks.

9. The system of claim 8, wherein performing column group refinement further comprises:

means for determining whether one or more columns in the query are the same as one or more columns in the previously received query; and when it is determined that the one or more columns are the same, means for retrieving stored statistics data for the previously received query; and means for using the retrieved statistics data for the query.

10. The system of claim 8, further comprising:

means for performing at least one of preliminary query analysis and predicate analysis to obtain the statistics, wherein the preliminary query analysis comprises identifying related data store objects including tables and indexes, and wherein the predicate analysis comprises predicate analysis, classification of predicates, and identification of columns that are referenced in one or more of the predicates.

11. The system of claim 8, further comprising:

means for iteratively performing the statistics check to determine whether existing statistics are at least one of missing, conflicting, obsolete, and volatile.

12. The system of claim 11, wherein the statistics collection command is generated based on the statistics check.

13. The system of claim 8, further comprising:

means for executing the query using the improved statistics; and means for determining whether execution performance of the query is acceptable.

14. The system of claim 8, further comprising:

means for performing at least one of data correlation and data skew analysis to generate the statistics data that indicates whether columns are correlated or independent and whether columns are point skewed, range skewed or uniformly distributed.

\* \* \* \* \*